(12) United States Patent
Yamauchi et al.

(10) Patent No.: US 10,199,855 B2
(45) Date of Patent: Feb. 5, 2019

(54) POWER RECEIVING APPARATUS AND WIRELESS POWER-TRANSFER SYSTEM

(71) Applicant: FUJI XEROX CO., LTD., Tokyo (JP)

(72) Inventors: Akihito Yamauchi, Kanagawa (JP);
Tsutomu Kimura, Kanagawa (JP);
Yoshihiko Nemoto, Kanagawa (JP);
Masahiro Sato, Kanagawa (JP); Kengo Tokuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/492,309

(22) Filed: Apr. 20, 2017

(65) Prior Publication Data

US 2018/0115182 A1   Apr. 26, 2018

(30) Foreign Application Priority Data

Oct. 25, 2016 (JP) ................................. 2016-208957

(51) Int. Cl.
*H02J 7/02* (2016.01)
*H02J 50/10* (2016.01)
*H02J 50/20* (2016.01)
*H04B 5/00* (2006.01)
*H02J 50/80* (2016.01)
*H02J 7/00* (2006.01)

(52) U.S. Cl.
CPC .............. *H02J 7/025* (2013.01); *H02J 50/10* (2016.02); *H02J 50/20* (2016.02); *H02J 50/80* (2016.02); *H04B 5/0037* (2013.01); *H02J 7/0013* (2013.01)

(58) Field of Classification Search
CPC ........................................................ H02J 7/025
USPC ........................................................ 320/108
See application file for complete search history.

(56) References Cited

U.S. PATENT DOCUMENTS 9,627,895 B2 * 4/2017 Tsukamoto ............. H02J 7/025
2008/0197804 A1 * 8/2008 Onishi ..................... H02J 7/025
320/108

FOREIGN PATENT DOCUMENTS

JP         4494426 B2    6/2010
JP         5550249 B2    7/2014

* cited by examiner

*Primary Examiner* — Edward Tso
*Assistant Examiner* — Ahmed Omar
(74) *Attorney, Agent, or Firm* — Oliff PLC (57) ABSTRACT

A power-receiving apparatus includes a power supply unit and a wireless communication unit. The power supply unit includes a first rechargeable battery that accumulates power, a power-receiving unit that receives power transferred from a power-transfer apparatus by using a radio system, and a power controller that, in a wireless charging mode, performs control of charging of the first rechargeable battery in accordance with the power received by the power-receiving unit and stops supply of the power to a main controller. The wireless charging mode is set for wirelessly charging the first rechargeable battery as an operation mode. The main controller performs control of predetermined operations of the power-receiving apparatus. The wireless communication unit operates when receiving supply of the power from the power supply unit and wirelessly communicates with the power-transfer apparatus.

8 Claims, 6 Drawing Sheets

POWER RECEIVING APPARATUS AND WIRELESS POWER-TRANSFER SYSTEM

CROSS-REFERENCE TO RELATED APPLICATIONS

This application is based on and claims priority under 35 USC 119 from Japanese Patent Application No. 2016-208957 filed Oct. 25, 2016.

BACKGROUND

(i) Technical Field

The present invention relates to a power-receiving apparatus and a wireless power-transfer system.

(ii) Related Art

An example of a wireless power transfer technique is a radio system. Compared with other systems, a radio system is characterized not only by a short power transfer distance, but also a low power transfer capacity, the power transfer capacity indicating the capacity of supplying power used for charging. Accordingly, if a central processing unit (CPU) that consumes relatively high amounts of power is running in a power-receiving apparatus while a rechargeable battery is being charged using power transferred through the radio system, the rechargeable battery is not charged quickly.

SUMMARY

According to an aspect of the invention, there is provided a power-receiving apparatus including a power supply unit and a wireless communication unit. The power supply unit includes a first rechargeable battery that accumulates power, a power-receiving unit that receives power transferred from a power-transfer apparatus by using a radio system, and a power controller that, in a wireless charging mode, performs control of charging of the first rechargeable battery in accordance with the power received by the power-receiving unit and stops supply of the power to a main controller. The wireless charging mode is set for wirelessly charging the first rechargeable battery as an operation mode. The main controller performs control of predetermined operations of the power-receiving apparatus. The wireless communication unit operates when receiving supply of the power from the power supply unit and wirelessly communicates with the power-transfer apparatus.

BRIEF DESCRIPTION OF THE DRAWINGS

Exemplary embodiments of the present invention will be described in detail based on the following figures, wherein.

DETAILED DESCRIPTION

Hereinafter, an exemplary embodiment of the present invention will be described in detail with reference to the attached drawings.

System Configuration

Figure 1:
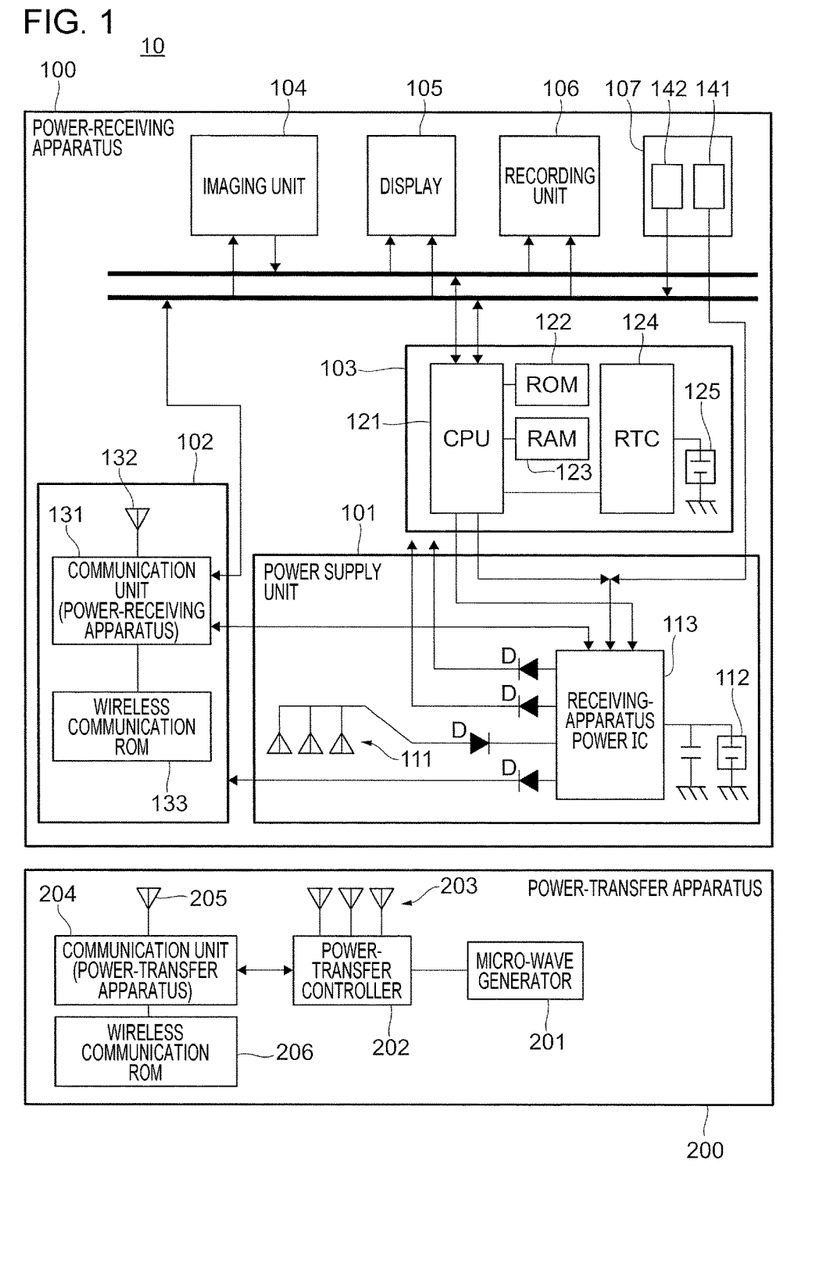
FIG. 1 is a block diagram illustrating the configuration of components of a wireless power-transfer system according to an exemplary embodiment of the present invention.

FIG. 1 is a block diagram illustrating the configuration of components of a wireless power-transfer system 10 according to the exemplary embodiment of the present invention. The wireless power-transfer system 10 includes a power-receiving apparatus 100 and a power-transfer apparatus 200. The power-receiving apparatus 100 operates using power accumulated in a rechargeable battery 112. The power-transfer apparatus 200 supplies power to the power-receiving apparatus 100 through a radio system.

Examples of the power-receiving apparatus 100 include not only a mobile electronic apparatus such as a notebook computer, a tablet computer, a smartphone, a mobile phone, a digital camera, a digital video camera, or a game machine, but also a stationary apparatus such as an image forming apparatus equipped with a rechargeable battery.

The image forming apparatus is an apparatus that forms an image corresponding to input data on a recording material and has functions of, for example, copying, scanning, fax transmission/reception, and printing. However, the image forming apparatus may be an apparatus having only one specific function, that is, for example, a scanner, a fax machine, or a printer (including a three-dimensional printer).

The power-receiving apparatus 100 has a function of receiving power, as operating power, supplied through the radio system. The power-receiving apparatus 100 includes a power supply unit 101 that supplies components of the power-receiving apparatus 100 with the power, a communication block 102 used for communication with an external apparatus, a controller 103 that controls predetermined operations of the power-receiving apparatus 100, an imaging unit 104 used for capturing an image of a subject, a display 105 used for displaying information, a recording unit 106 used for storing information, and an operation unit 107 that receives an input operation performed by a user.

The power supply unit 101 includes a receiving antenna 111 that receives the power supplied from the power-transfer apparatus 200 through the radio system, rectifier diodes D that control power supply directions, the built-in rechargeable battery 112 that accumulates power, and a receiving-apparatus power integrated circuit (IC) 113 that controls the operation of the power supply unit 101. The receiving antenna 111 is an example of a power-receiving unit and includes multiple elements arranged in a matrix form. In this exemplary embodiment, the receiving antenna 111 receives high power microwaves in a 5.8 GHz band. The energy of the microwaves received by the receiving antenna 111 is converted into a direct current by the rectifier diodes D, and the direct current is supplied to the receiving-apparatus power IC 113.

The receiving-apparatus power IC 113 operates using the power supplied from the rechargeable battery 112. The receiving-apparatus power IC 113 is an example of a power controller. The receiving-apparatus power IC 113 includes circuits such as a remaining-capacity detection circuit, a power-transfer switch, a voltage regulator, and an operation-mode determination circuit.

The remaining-capacity detection circuit measures the remaining capacity of the rechargeable battery 112 by using one of a voltage method, Coulomb-counting, Kalman Filtering, and the Impedance Track method. The power-transfer switch switches the supply target or the range of the power in accordance with an operation mode. The voltage regulator is used, for example, for stabilizing the voltage value of the power received by the receiving antenna 111 or for stabilizing the voltage values of power supplied from the rechargeable battery 112 to the components.

The operation-mode determination circuit determines an operation mode on the basis of power-supply operation signals input from the controller 103 (a CPU 121) that performs predetermined control of the power-receiving apparatus 100 and from the operation unit 107 (a main power switch 141), an operation-mode instruction signal given by the controller 103 (CPU 121), the potential of the power-supply line, a detection signal received from the communication block 102 (a communication unit 131), and the like. These circuits are composed of gate circuits and other circuits and perform limited operations. Accordingly, the receiving-apparatus power IC 113 consumes a smaller amount of power than an amount of power consumed by the controller 103 that performs predetermined control of the power-receiving apparatus 100.

In a wireless charging mode, the receiving-apparatus power IC 113 supplies power accumulated in the rechargeable battery 112 to the communication block 102 and does not supply the power to the controller 103, the imaging unit 104, the display 105, the recording unit 106, or the operation unit 107. The wireless charging mode is an operation mode in which the rechargeable battery 112 is charged using the power received by the receiving antenna 111. In this exemplary embodiment, with respect to the power supply provided from the rechargeable battery 112 in the wireless charging mode, power supply provided to only the receiving-apparatus power IC 113 that consumes the smaller amount of power and the communication block 102 is continued, while power supply provided to the controller 103 that consumes the larger amount of power and to the other function units the power is stopped. Accordingly, the power-receiving apparatus 100 consumes a small amount of power in the wireless charging mode.

Note that in a normal operation mode, the receiving-apparatus power IC 113 supplies the power accumulated in the rechargeable battery 112 to the communication block 102, the controller 103, the imaging unit 104, the display 105, the recording unit 106, and the operation unit 107. In a case where a power cable is used for the power transfer in the normal operation mode, the receiving-apparatus power IC 113 also supplies the power accumulated in the rechargeable battery 112 to the communication block 102, the controller 103, the imaging unit 104, the display 105, the recording unit 106, and the operation unit 107.

The communication block 102 includes the communication unit 131 used for wireless communication, a communication antenna 132, a wireless communication read-only memory (ROM) 133 used for storing settings, an interface used for communication with the controller 103, and an interface used for communication with the power supply unit 101. The communication block 102 is an example of a wireless communication unit. The communication block 102 is supplied with power regardless of the operation mode of the power supply unit 101.

Note that the communication block 102 may be configured to operate using power extracted from an electromagnetic wave received through the communication antenna 132. The communication block 102 is used not only to receive microwaves for power transfer (hereinafter, referred to as power-transfer microwaves) transmitted by the power-transfer apparatus 200, but also to transmit a signal for notifying the power-transfer apparatus 200 of the location of the power-receiving apparatus 100 and a signal for requesting the start of power transfer.

The controller 103 includes the CPU 121 that performs predetermined control of the power-receiving apparatus 100, a ROM 122, a random-access memory (RAM) 123, a real time clock (RTC) IC 124 that measures a period of time, a RTC coin battery 125, a communication bus used for communication with peripheral components, and a data bus used for data exchange.

The imaging unit 104 includes an optical system, an imaging device, and other elements. The display 105 includes a display panel, a drive circuit, and other elements. The recording unit 106 includes a recording controller that writes data to an attachable and detachable recording medium and other elements. The operation unit 107 includes the main power switch 141, an operation switch 142, and other elements.

The power-transfer apparatus 200 includes a microwave generator 201 that generates microwaves, a power-transfer controller 202 that controls the phase and amplitude of the microwaves, a power transmission antenna 203 that transmits power-transfer microwaves with high power, a communication unit 204 for the wireless communication, a communication antenna 205, and a wireless communication ROM 206. In this exemplary embodiment, the power transmission antenna 203 is an array antenna in which multiple antenna elements are arranged. The directivity of the power transmission antenna 203 is electrically changed by adjusting the amplitude and phase of each microwave for the corresponding antenna element.

The communication antenna 205 may be composed of multiple antenna elements, with each antenna element having different directivity. In this case, the strengths of signals received by the respective antenna elements are used to detect the location and the orientation of the power-receiving apparatus 100. When an electric wave is received from the power-receiving apparatus 100, the power-transfer controller 202 directs the power transmission antenna 203 in a direction in which the communication electric wave received from the power-receiving apparatus 100 exhibits a high strength. The power-transfer controller 202 then starts power transfer.

Functional Configuration of Receiving-Apparatus Power IC 113

Figure 2:
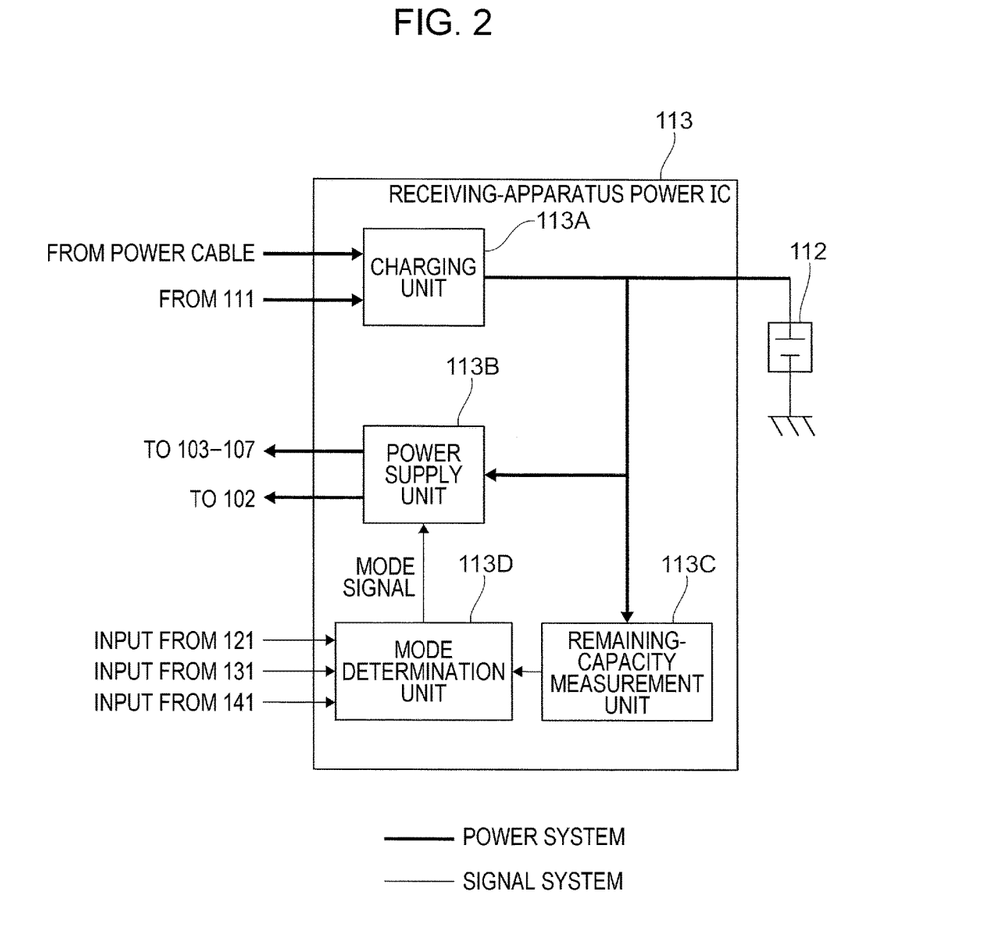
FIG. 2 is a diagram illustrating the functional configuration of a power source of a power-receiving apparatus.

FIG. 2 is a diagram illustrating the functional configuration of the receiving-apparatus power IC 113. The receiving-apparatus power IC 113 includes a charging unit 113A, a power supply unit 113B, a remaining-capacity measurement unit 113C, and a mode determination unit 113D. The charging unit 113A charges the rechargeable battery 112 by using power supplied from an external apparatus. The power supply unit 113B supplies the power accumulated in the rechargeable battery 112 to the components of the power-receiving apparatus 100. The remaining-capacity measurement unit 113C measures the remaining capacity of the rechargeable battery 112. The mode determination unit 113D determines the operation mode of the power supply unit 101.

The charging unit 113A charges the rechargeable battery 112 by using the power input from the receiving antenna 111 or power input via the power cable. In accordance with the operation mode, the power supply unit 113B performs or stops power supply, that is, switches power supply targets that are the communication block 102, the controller 103, the imaging unit 104, the display 105, the recording unit 106, and the operation unit 107. Note that regardless of the operation mode, the power is supplied to the charging unit 113A, the remaining-capacity measurement unit 113C, and the mode determination unit 113D.

The remaining-capacity measurement unit 113C measures the remaining capacity of the rechargeable battery 112 by using one of the voltage method, Coulomb-counting, Kalman Filtering, and the Impedance Track method as described above and outputs the measurement result to the mode determination unit 113D. The mode determination unit 113D determines the operation mode on the basis of state information provided from the external apparatus or state information stored in the power-receiving apparatus 100 and issues a mode signal indicating the determined operation mode to the power supply unit 113B. The details of a determination operation of the mode determination unit 113D will be described later.

Example Operation 1 of Power Supply Unit 101

Figure 3:
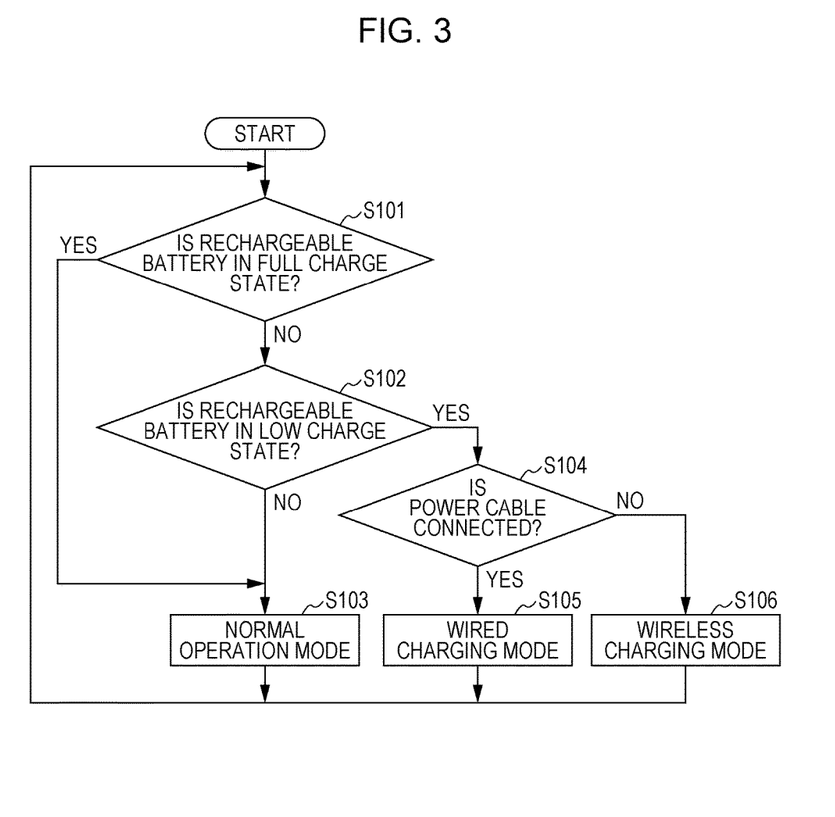
FIG. 3 is a flowchart illustrating operation steps performed by the power source of the power-receiving apparatus in Operation Example 1.

Hereinafter, Example Operation 1 of the power supply unit 101 will be described. FIG. 3 is a flowchart illustrating operation steps performed by the receiving-apparatus power IC 113 in Example Operation 1. The receiving-apparatus power IC 113 functioning as the power controller first determines whether the rechargeable battery 112 is in a full charge state (step S101).

Specifically, if the measured remaining capacity is equal to or larger than a predetermined first threshold, the receiving-apparatus power IC 113 determines that the rechargeable battery 112 is in the full charge state. If the result of the determination in step S101 is affirmative, that is, if the remaining capacity is equal to or larger than the first threshold, the receiving-apparatus power IC 113 proceeds to step S103. The first threshold is determined on the basis of the battery capacity of the rechargeable battery 112.

If the result of the determination in step S101 is negative, that is, if the remaining capacity is less than the first threshold, the receiving-apparatus power IC 113 determines whether the rechargeable battery 112 is in a low charge state (step S102). Whether or not the rechargeable battery 112 is in the low charge state is determined on the basis of whether the measured remaining capacity is less than a predetermined second threshold. The second threshold has a value less than that of the first threshold. The second threshold is determined on the basis of the battery capacity of the rechargeable battery 112 to prevent charging from being started unnecessarily.

If the result of the determination in step S102 is negative, that is, if the remaining capacity is equal to or larger than the second threshold, the receiving-apparatus power IC 113 determines that the rechargeable battery 112 does not need to be charged and proceeds to step S103. In other words, the receiving-apparatus power IC 113 causes the power supply unit 101 to operate in the normal operation mode (step S103). In this case, the power supply unit 101 supplies power to all of the components of the power-receiving apparatus 100. Note that the power supply unit 101 may be configured such that if the main power switch 141 is not switched on, the power supply unit 101 supplies the power to the communication block 102 and the controller 103 and does not supply the power to the other function units.

If the result of the determination in step S102 is affirmative, that is, if the remaining capacity is less than the second threshold, the receiving-apparatus power IC 113 determines whether the power is being supplied via the power cable (step S104). The receiving-apparatus power IC 113 determines whether the power is being supplied via the power cable on the basis of, for example, the potential of the connection midpoint in a divided-voltage resistance circuit (not illustrated).

The divided-voltage resistance circuit is composed of two divided-voltage resistors connected in series. The divided-voltage resistance circuit is connected to the power-supply line on one end and is grounded on the other end. The potential of the connection midpoint between the two divided-voltage resistors is extracted for the determination. If the power is transferred via the power cable, the potential of the power-supply line is higher than a potential measured in the case of power supply from the rechargeable battery 112. If the potential of the connection midpoint is higher than a threshold set on the basis of a difference between the potentials, the receiving-apparatus power IC 113 determines that the power is being supplied via the power cable.

If the result of the determination in step S104 is affirmative, that is, if the power is being supplied via the power cable, the receiving-apparatus power IC 113 enters a wired charging mode (step S105). In this case, like the normal operation mode, the receiving-apparatus power IC 113 supplies the power to the communication block 102, the controller 103, the imaging unit 104, the display 105, the recording unit 106, and the operation unit 107. Note that if the power-receiving apparatus 100 does not have a connection terminal for the power cable, steps S104 and S105 are not performed. In addition, if the main power switch 141 is not switched on, the power supply unit 101 supplies the power to only the communication block 102 and the controller 103 but does not supply the power to the other function units.

If the result of the determination in step S104 is negative, that is, if the power is not being supplied via the power cable, the receiving-apparatus power IC 113 in Example Operation 1 enters the wireless charging mode (step S106). In this case, the power supply unit 101 supplies the power to only the communication block 102 and does not supply the power to the other function units (including the controller 103).

Figure 4:
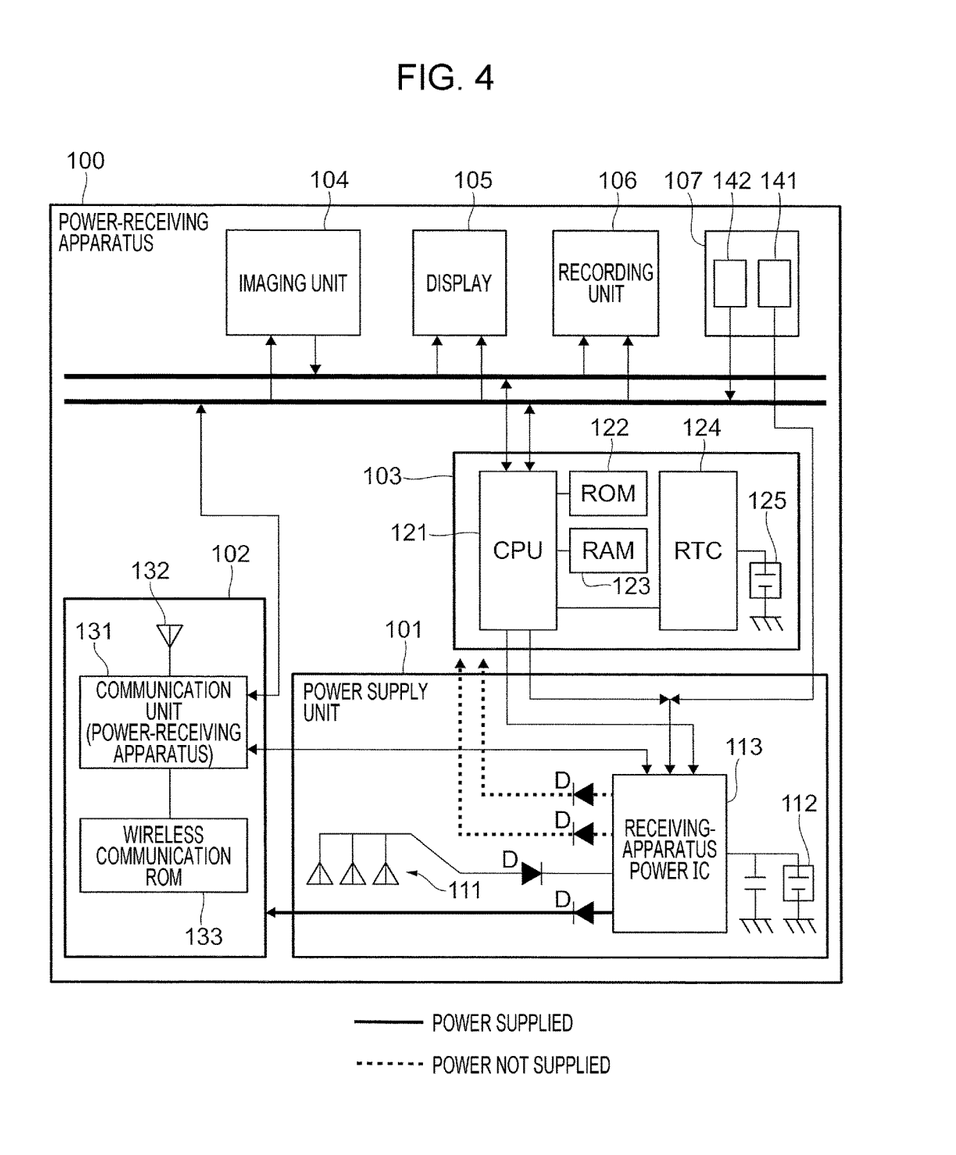
FIG. 4 is a diagram illustrating how power is transferred in a wireless charging mode.

FIG. 4 is a diagram illustrating how power is transferred in the wireless charging mode. The receiving-apparatus power IC 113 may supply the power through three paths. However, in FIG. 4, the receiving-apparatus power IC 113 supplies the power to only the communication block 102 as indicated by a thick line, and the communication block 102 is thus in an operating state. In contrast, the power supply provided to the controller 103, the imaging unit 104, the display 105, the recording unit 106, and the operation unit 107 is stopped, and thus these function units do not consume the power.

After entering the wireless charging mode, the receiving-apparatus power IC 113 transmits, to the power-transfer apparatus 200 through the communication block 102, a signal for requesting transmission of the power-transfer microwaves. For this communication, a frequency band different from that of the power-transfer microwaves is used. For example, an electric wave in a 2.45 GHz band is used. However, the same frequency band as that of the power-transfer microwaves, that is, an electric wave in a 5.8 GHz band may also be used. In this exemplary embodiment, the electric wave transmitted from the communication unit 131 is also used to notify the power-transfer apparatus 200 of the location of the power-receiving apparatus 100.

Upon receiving a communication signal from the power-receiving apparatus 100, the power-transfer apparatus 200 starts emission of the power-transfer microwaves through the power transmission antenna 203 under the control of the power-transfer controller 202. At this time, the power-transfer controller 202 controls the directivity of the power transmission antenna 203 such that a microwave emitted toward the location of the power-receiving apparatus 100 has a high strength.

Emission of the power-transfer microwaves toward the power-receiving apparatus 100 controlled to be in the wireless charging mode is thereby started, and charging the rechargeable battery 112 of the power-receiving apparatus 100 is started. The receiving-apparatus power IC 113 of the power-receiving apparatus 100 repeats the operation steps illustrated in FIG. 3, the rechargeable battery 112 ultimately enters the full charge state, and the result of the determination in step S101 becomes affirmative. In response, the receiving-apparatus power IC 113 cancels the wireless charging mode and enters the normal operation mode. At this time, the receiving-apparatus power IC 113 notifies the power-transfer apparatus 200 through the communication unit 131 that the power-receiving apparatus 100 is fully charged and does not need to receive power transfer. Upon receiving a signal indicating the full charge, the power-transfer controller 202 stops the emission of the power-transfer microwaves.

Note that if multiple power-receiving apparatuses 100 are present within the range of the wireless power transfer, rechargeable batteries 112 of the respective power-receiving apparatuses 100 are in various charge states. For example, some rechargeable batteries 112 of the respective power-receiving apparatuses 100 need to be charged, and other rechargeable batteries 112 do not need to be charged. In addition, a charge start time and a charge end time vary with the power-receiving apparatuses 100. If the power-transfer microwaves are transmitted to the multiple power-receiving apparatuses 100, and if at least one of the rechargeable batteries 112 of the corresponding power-receiving apparatus 100 needs to be charged even though charging of a different one of the rechargeable batteries 112 of the corresponding power-receiving apparatus 100 is completed, the power-transfer apparatus 200 continues transmitting the power-transfer microwaves.

Even though one of the power-receiving apparatuses 100, the rechargeable battery 112 of which has been charged or that does not need to be charged, receives the power-transfer microwaves through the receiving antenna 111, the result of step S101 for the receiving-apparatus power IC 113 of power-receiving apparatus 100 is affirmative, and the normal operation mode is maintained.

As described above, in the power-receiving apparatus 100 that performs Example Operation 1, the power is not supplied in the wireless charging mode to the controller 103 including the CPU 121 serving as a main controller that performs predetermined control of the system, and the power-receiving apparatus 100 thus consumes a smaller amount of power than in a case where the controller 103 operates even in the wireless charging mode.

This causes the charging of the rechargeable battery 112 of the power-receiving apparatus 100 to proceed efficiently even in a case where the rechargeable battery 112 is charged using power transferred by using the radio system that exhibits a small amount of transferred power. As the result, even if the multiple power-receiving apparatuses 100 are present in the power transfer range, the power-receiving apparatuses 100 may be charged in parallel. Note that the power-receiving apparatuses 100 charged in parallel may have the respective rechargeable batteries 112 having different capacities, and the manufacturers or models of the power-receiving apparatuses 100 may differ from each other.

Example Operation 2 of Power Supply Unit 101

Figure 5:
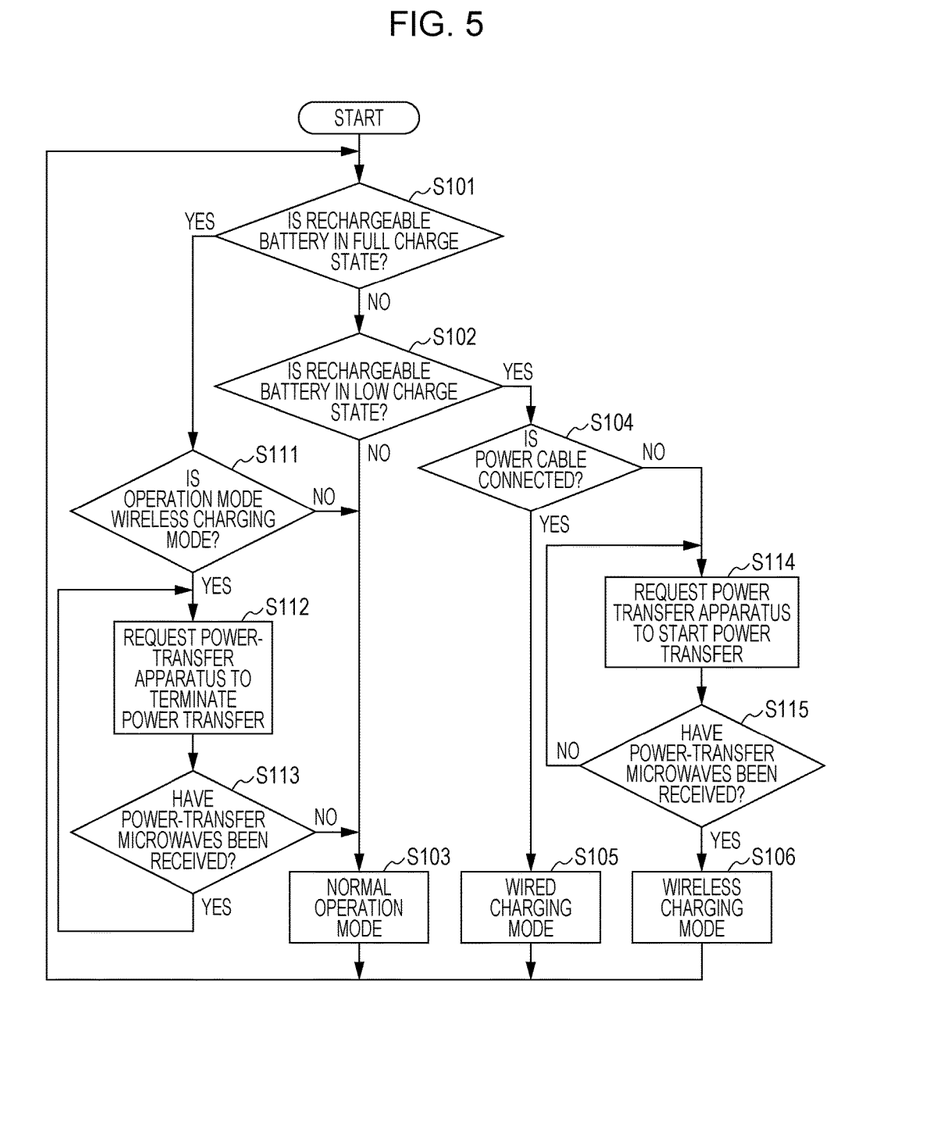
FIG. 5 is a flowchart illustrating operation steps performed by the power source of the power-receiving apparatus in Operation Example 2.

Hereinafter, Example Operation 2 of the power supply unit 101 will be described. FIG. 5 is a flowchart illustrating operation steps performed by the receiving-apparatus power IC 113 in Example Operation 2. Components in FIG. 5 corresponding to those in FIG. 3 are denoted by the same reference numerals.

The receiving-apparatus power IC 113 functioning as the power controller first determines whether the rechargeable battery 112 is in the full charge state (step S101). If the measured remaining capacity is equal to or larger than the predetermined first threshold, the receiving-apparatus power IC 113 determines that the rechargeable battery 112 is in the full charge state. If the result of the determination in step S101 is affirmative, that is, if the remaining capacity is equal to or larger than the first threshold, the receiving-apparatus power IC 113 proceeds to step S111.

If the result of the determination in step S101 is negative, that is, if the remaining capacity is less than the first threshold, the receiving-apparatus power IC 113 determines whether the rechargeable battery 112 is in the low charge state (step S102). Whether or not the rechargeable battery 112 is in the low charge state is determined on the basis of whether the measured remaining capacity is less than the predetermined second threshold.

If the result of the determination in step S102 is negative, that is, if the remaining capacity is equal to or larger than the second threshold, the rechargeable battery 112 does not need to be charged, and the receiving-apparatus power IC 113 thus causes the power supply unit 101 to operate in the normal operation mode (step S103). In this case, the power supply unit 101 supplies the power to all of the components of the power-receiving apparatus 100. Note that the power supply unit 101 may be configured such that if the main power switch 141 is not switched on, the power supply unit 101 supplies the power to only the communication block 102 and the controller 103 and does not supply the power to the other function units.

If the result of the determination in step S101 is affirmative, the receiving-apparatus power IC 113 determines whether the current operation mode is the wireless charging mode (step S111). If the result of the determination in step S111 is negative, the receiving-apparatus power IC 113 proceeds to step S103. In contrast, if the result of the determination in step S111 is affirmative, this indicates that the rechargeable battery 112 has been in the full charge state after the wireless charging, and the receiving-apparatus power IC 113 thus transmits, to the power-transfer apparatus 200 through the communication block 102, a signal for requesting the termination of the power transfer to the power-receiving apparatus 100 (step S112).

The receiving-apparatus power IC 113 determines whether the power-transfer microwaves transmitted by the power-transfer apparatus 200 have been received (step S113). The receiving-apparatus power IC 113 determines whether the power-transfer microwaves have been received on the basis of, for example, whether the communication block 102 has received the power-transfer microwaves or whether received power is present in the receiving antenna 111. The receiving-apparatus power IC 113 may also determine whether the power-transfer microwaves have been received on the basis of whether a signal transmitted from the communication antenna 205 to indicate the completion of the power transfer has been received. As long as the result of the determination in step S113 is affirmative, the receiving-apparatus power IC 113 requests, through the communication block 102, the power-transfer apparatus 200 to stop the power transfer to the power-receiving apparatus 100 performed using the power-transfer microwaves. At this time, the receiving-apparatus power IC 113 may also request the power-transfer apparatus 200 to stop outputting the power-transfer microwaves.

If the result of the determination in step S113 is negative, and if receiving of the power-transfer microwaves is not detected any more, the receiving-apparatus power IC 113 proceeds to step S103, and the wireless charging mode is switched to the normal operation mode.

If the result of the determination in step S102 is affirmative, that is, if the remaining capacity is less than the second threshold, the receiving-apparatus power IC 113 determines whether the power is being supplied via the power cable (step S104). The receiving-apparatus power IC 113 determines whether the power is being supplied via the power cable on the basis of the potential of the connection midpoint in the divided-voltage resistance circuit (not illustrated).

If the result of the determination in step S104 is affirmative, that is, if the power is being supplied via the power cable, the receiving-apparatus power IC 113 enters the wired charging mode (step S105). In this case, like the normal operation mode, the receiving-apparatus power IC 113 supplies the power to the communication block 102, the controller 103, the imaging unit 104, the display 105, the recording unit 106, and the operation unit 107. Note that if the power-receiving apparatus 100 does not have a connection terminal for the power cable, steps S104 and S105 are not performed. In addition, the power supply unit 101 may be configured such that if the main power switch 141 is not switched on, the power supply unit 101 supplies the power to the communication block 102 and the controller 103 and does not supply the power to the other function units.

In contrast, if the result of the determination in step S104 is negative, that is, if the power is not being supplied via the power cable, the receiving-apparatus power IC 113 transmits, through the communication block 102, a signal for requesting the power-transfer apparatus 200 to start the power transfer to the power-receiving apparatus 100 (step S114). In Example Operation 2, the power-receiving apparatus 100 transmits the signal for requesting the power transfer start to the power-transfer apparatus 200 before entering the wireless charging mode. The signal transmitted from the communication unit 131 is also used to notify the power-transfer apparatus 200 of the location of the power-receiving apparatus 100.

Upon receiving the communication electric wave from the power-receiving apparatus 100, the power-transfer apparatus 200 starts transmitting the power-transfer microwaves under the control of the power-transfer controller 202. At this time, the power-transfer controller 202 controls the directivity of the power transmission antenna 203 such that a power-transfer microwave emitted toward the location of the power-receiving apparatus 100 has a high strength.

The receiving-apparatus power IC 113 determines whether the power-transfer microwaves have been received (step S115). As long as the result of the determination in step S115 is negative, the receiving-apparatus power IC 113 requests, through the communication block 102, the power-transfer apparatus 200 to start the power transfer to the power-receiving apparatus 100 performed using the power-transfer microwaves. Note that the determination may be performed on the basis of a signal transmitted from the communication antenna 205 to indicate the start of the power transfer. If the result of the determination in step S115 is affirmative, and if receiving of the power-transfer microwaves is detected, the receiving-apparatus power IC 113 enters the wireless charging mode (step S106). In this case, the power supply unit 101 continues the power supply provided to the communication block 102 and does not supply the power to the other function units (including the controller 103).

If the rechargeable battery 112 ultimately enters the full charge state, the receiving-apparatus power IC 113 performs steps S111 to 113 described above, cancels the wireless charging mode, and enters the normal operation mode.

As described above, also in the power-receiving apparatus 100 that performs Example Operation 2, the power is not supplied in the wireless charging mode to the controller 103 including the CPU 121 serving as the main controller that performs predetermined control of the system, and the power-receiving apparatus 100 thus consumes a smaller amount of power than in the case where the controller 103 operates even in the wireless charging mode.

This causes the charging of the rechargeable battery 112 of the power-receiving apparatus 100 to proceed efficiently even in the case where the rechargeable battery 112 is charged using power transferred by using the radio system that exhibits a small amount of transferred power. As the result, even if the multiple power-receiving apparatuses 100 are present in the power transfer range, the power-receiving apparatuses 100 may be charged in parallel. Note that the power-receiving apparatuses 100 charged in parallel may have the respective rechargeable batteries 112 having different capacities, and the manufacturers or models of the power-receiving apparatuses 100 may differ from each other.

In Example Operation 2, the receiving-apparatus power IC 113 operates in the wireless charging mode from the start to the end of receiving of the power-transfer microwaves. Accordingly, when the wireless charging is not actually allowed to be performed, the receiving-apparatus power IC 113 may be prevented from operating in the wireless charging mode.

Example Operation 3 of Power Supply Unit 101

Figure 6:
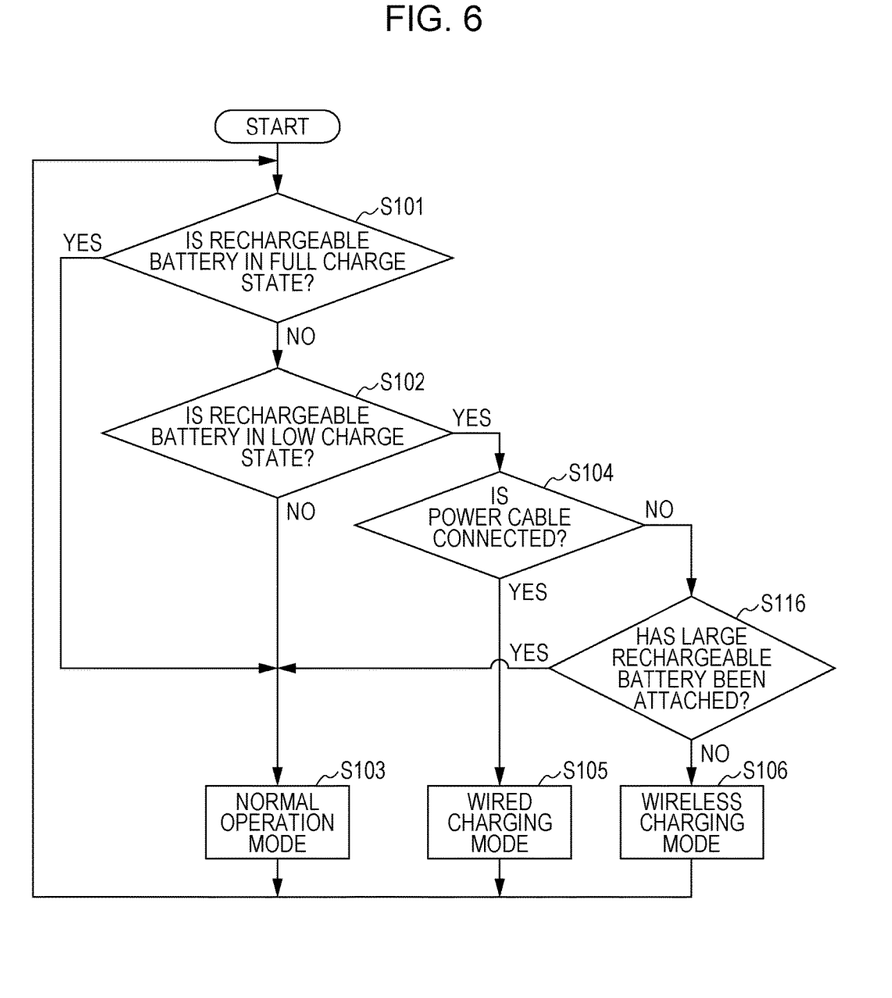
FIG. 6 is a flowchart illustrating operation steps performed by the power source of the power-receiving apparatus in Operation Example 3.

Hereinafter, Example Operation 3 of the power supply unit 101 will be described. FIG. 6 is a flowchart illustrating operation steps performed by the receiving-apparatus power IC 113 in Example Operation 3. Components in FIG. 6 corresponding to those in FIG. 3 are denoted by the same reference numerals.

The receiving-apparatus power IC 113 functioning as the power controller first determines whether the rechargeable battery 112 is in the full charge state (step S101). If the measured remaining capacity is equal to or larger than the predetermined first threshold, the receiving-apparatus power IC 113 determines that the rechargeable battery 112 is in the full charge state. If the result of the determination in step S101 is affirmative, that is, if the remaining capacity is equal to or larger than the first threshold, the receiving-apparatus power IC 113 proceeds to step S103.

If the result of the determination in step S101 is negative, that is, if the remaining capacity is less than the first threshold, the receiving-apparatus power IC 113 determines whether the rechargeable battery 112 is in the low charge state (step S102). Whether or not the rechargeable battery 112 is in the low charge state is determined on the basis of whether the measured remaining capacity is less than the predetermined second threshold.

If the result of the determination in step S102 is negative, that is, if the remaining capacity is equal to or larger than the second threshold, the rechargeable battery 112 does not need to be charged, and the receiving-apparatus power IC 113 thus causes the power supply unit 101 to operate in the normal operation mode (step S103). In this case, the power supply unit 101 supplies the power to all of the components of the power-receiving apparatus 100. Note that the power supply unit 101 may be configured such that if the main power switch 141 is not switched on, the power supply unit 101 supplies the power to only the communication block 102 and the controller 103 and does not supply the power to the other function units.

If the result of the determination in step S102 is affirmative, that is, if the remaining capacity is less than the second threshold, the receiving-apparatus power IC 113 determines whether the power is being supplied via the power cable (step S104). The receiving-apparatus power IC 113 determines whether the power is being supplied via the power cable on the basis of the potential of the connection midpoint in the divided-voltage resistance circuit (not illustrated).

If the result of the determination in step S104 is affirmative, that is, if the power is being supplied via the power cable, the receiving-apparatus power IC 113 enters the wired charging mode (step S105). In this case, like the normal operation mode, the receiving-apparatus power IC 113 supplies the power to the communication block 102, the controller 103, the imaging unit 104, the display 105, the recording unit 106, and the operation unit 107. Note that if the power-receiving apparatus 100 does not have a connection terminal for the power cable, steps S104 and S105 are not performed. In addition, the power supply unit 101 may be configured such that if the main power switch 141 is not switched on, the power supply unit 101 supplies the power to the communication block 102 and the controller 103 and does not supply the power to the other function units.

In contrast, if the result of the determination in step S104 is negative, that is, if the power is not being supplied via the power cable, the receiving-apparatus power IC 113 determines whether a large rechargeable battery (not illustrated) has been attached to the power-receiving apparatus 100 (step S116). The large rechargeable battery is an example of a second rechargeable battery. If the result of the determination in step S116 is affirmative, that is, if the large rechargeable battery has been attached to the power-receiving apparatus 100, the receiving-apparatus power IC 113 proceeds to step S103. The large rechargeable battery has a larger capacity than the capacity of the built-in rechargeable battery 112 and may thus supply the power continuously. Note that a configuration in which if the remaining capacity of the large rechargeable battery is also small, the receiving-apparatus power IC 113 proceeds to step S106 may be employed.

If the result of the determination in step S116 is negative, that is, if the large rechargeable battery has not been attached to the power-receiving apparatus 100, the receiving-apparatus power IC 113 proceeds to step S106. The receiving-apparatus power IC 113 having proceeded to step S106 transmits, through the communication block 102, the signal for requesting the power-transfer apparatus 200 to start the power transfer to the power-receiving apparatus 100.

Upon receiving, from the power-receiving apparatus 100, the signal for requesting the start of power transfer, the power-transfer apparatus 200 starts transmitting the power-transfer microwaves under the control of the power-transfer controller 202. At this time, the power-transfer controller 202 controls the directivity of the power transmission antenna 203 such that a microwave emitted toward the location of the power-receiving apparatus 100 has a high strength. The charging of the rechargeable battery 112 performed using the power received by the receiving antenna 111 is thereby started. If the rechargeable battery 112 ultimately enters the full charge state, the receiving-apparatus power IC 113 proceeds to step S103, cancels the wireless charging mode, and enters the normal operation mode.

As described above, also in the power-receiving apparatus 100 that performs Example Operation 3, the power is not supplied in the wireless charging mode to the controller 103 including the CPU 121 serving as the main controller that performs predetermined control of the system, and the power-receiving apparatus 100 thus consumes a smaller amount of power than in the case where the controller 103 operates even in the wireless charging mode.

This causes the charging of the rechargeable battery 112 of the power-receiving apparatus 100 to proceed efficiently even in the case where the rechargeable battery 112 is charged using power transferred by using the radio system that exhibits a small amount of transferred power. As the result, even if the multiple power-receiving apparatuses 100 are present in the power transfer range, the power-receiving apparatuses 100 may be charged in parallel. Note that the power-receiving apparatuses 100 charged in parallel may have the respective rechargeable batteries 112 having different capacities, and the manufacturers or models of the power-receiving apparatuses 100 may differ from each other.

In Example Operation 3, the receiving-apparatus power IC 113 operates in the wireless charging mode if the large rechargeable battery has not been attached to the power-receiving apparatus 100. Accordingly, when the wireless charging is not really needed, the receiving-apparatus power IC 113 is prevented from operating in the wireless charging mode.

Other Exemplary Embodiments

The exemplary embodiment of the present invention has heretofore been described; however, the technical scope of the present invention is not limited to the scope of the exemplary embodiment described above. From the description of the scope of claims, it is apparent that the technical scope of the invention includes various modifications and improvements made to the exemplary embodiment described above.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A power-receiving apparatus comprising:
a power supply including (i) a first rechargeable battery that accumulates power, (ii) a power-receiving unit that receives power transferred from a power-transfer apparatus by using a radio system, and (iii) a power controller that, in a wireless charging mode, performs control of charging of the first rechargeable battery in accordance with the power received by the power-receiving unit and stops supply of the power to a main controller of the power-receiving apparatus during the charging of the first rechargeable battery, the wireless charging mode being set for wirelessly charging the first rechargeable battery as an operation mode, the main controller performing control of predetermined operations of the power-receiving apparatus; and a wireless communication unit that operates when receiving supply of the power from the power supply and wirelessly communicates with the power-transfer apparatus.

2. The power-receiving apparatus according to claim 1, wherein if the first rechargeable battery enters a low charge state, the power controller sets the wireless charging mode as the operation mode.

3. The power-receiving apparatus according to claim 2, wherein if the first rechargeable battery enters a full charge state, the power controller cancels the wireless charging mode.

4. The power-receiving apparatus according to claim 1, wherein if a signal from the power-transfer apparatus is detected, the power controller sets the wireless charging mode as the operation mode.

5. The power-receiving apparatus according to claim 4, wherein if the signal from the power-transfer apparatus is not detected any more, the power controller cancels the wireless charging mode.

6. The power-receiving apparatus according to claim 1, wherein if attachment, to the power-receiving apparatus, of a second rechargeable battery having a larger capacity than a capacity of the first rechargeable battery is not detected, the power controller sets the wireless charging mode as the operation mode.

7. The power-receiving apparatus according to claim 6, wherein if the attachment of the second rechargeable battery is detected, the power controller cancels the wireless charging mode.

8. A wireless power-transfer system comprising:

a power-transfer apparatus that transfers power by using a radio system; and a power-receiving apparatus including a power supply and a wireless communication unit, the power supply including (i) a rechargeable battery that accumulates power, (ii) a power-receiving unit that receives power transferred from the power-transfer apparatus by using the radio system, and (iii) a power controller that, in a wireless charging mode, performs control of charging of the rechargeable battery in accordance with the power received by the power-receiving unit and stops supply of the power to a main controller of the power-receiving apparatus during the charging of the rechargeable battery, the wireless charging mode being set for wirelessly charging the rechargeable battery as an operation mode, the main controller performing control of predetermined operations of the power-receiving apparatus, the wireless communication unit operating when receiving supply of the power from the power supply and wirelessly communicating with the power-transfer apparatus.

\* \* \* \* \*